United States Patent
Arhab (12)

(10) Patent No.: US 6,390,263 B1
(45) Date of Patent: May 21, 2002

(54) LOCKING CLUTCH FOR COUPLING APPARATUS WITH HYDROKINETIC COUPLING

(75) Inventor: Rabah Arhab, Saint-Brice-sous-Foret (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/555,455

(22) PCT Filed: Sep. 30, 1999

(86) PCT No.: PCT/FR99/02333

§ 371 Date: May 31, 2000

§ 102(e) Date: May 31, 2000

(87) PCT Pub. No.: WO00/19126

PCT Pub. Date: Apr. 6, 2000

(30) Foreign Application Priority Data

Sep. 30, 1998 (FR) ............................................. 98 12207

(51) Int. Cl.[7] ............................................... F16H 45/02
(52) U.S. Cl. ..................... 192/3.29; 192/70.17; 192/212
(58) Field of Search ............................. 192/3.28, 3.29, 192/3.3, 70.17, 212; 464/68

(56) References Cited

U.S. PATENT DOCUMENTS 5,682,969 A * 11/1997 Ling ........................... 192/3.29
5,826,688 A * 10/1998 Arhab et al. ................ 192/3.29

FOREIGN PATENT DOCUMENTS

| FR | 2634849 | 2/1990 |
|----|---------|--------|
| FR | 2726620 | 5/1996 |
| FR | 2738890 | 3/1997 |
| FR | 2749634 | 12/1997 |
| WO | 9407058 | 3/1994 |
| WO | 0019126 | 4/2000 |

* cited by examiner

*Primary Examiner*—Richard M. Lorence
(74) *Attorney, Agent, or Firm*—Liniak, Berenato, Longarce & White (57) ABSTRACT

The clutch includes a crown ring (22) integral with an annular rim of axial orientation, which a guide washer (17) has externally, this guide washer being coupled elastically of [sic] a web (14) integral in rotation with the output element (1) of a hydrokinetic coupling apparatus. The crown ring (22) meshes with a drive disc intended to be integrated in rotation, in such a way that it can be de-clutched, with the input element (2) of the said apparatus.

9 Claims, 5 Drawing Sheets

LOCKING CLUTCH FOR COUPLING APPARATUS WITH HYDROKINETIC COUPLING

BACKGROUND OF THE INVENTION

1. Field of the Invention

The present invention relates to the latching clutches for hydrokinetic coupling apparatus, especially for a motor vehicle. It also relates to the hydrokinetic coupling apparatus including such a clutch.

2. Description of Related Art

This clutch includes an input element intended to be linked in rotation to a driving shaft and an output element intended to be linked to a driven shaft, and is described in the document FR-A 2 749 634.

In the latter, the latching clutch includes at least one drive disc intended to be integrated, in such a way that it can be de-clutched, with the input element.

The disc is coupled to a first guide washer, linked elastically to a web integral with the output element. The first guide washer, in order to do this, has a toothing with axial spurs and the same goes for the drive disc intended to be clamped, such that it can be de-clutched, between a transverse wall, belonging to the input element, and a piston integral in rotation with the transverse wall, being mounted axially with respect to this wall. The toothing of the drive disc engages with the toothing of the first guide washer in such a way that the drive disc is linked in rotation to the guide washer while being able to be shifted axially with respect to it.

The spurs result from cutting-out and folding of the first metal guide washer. The first guide washer exhibits, at its outer periphery, an annular rim of axial orientation surrounding the web The object of the present invention is to pull part of this guide washer, and to do so simply and economically.

SUMMARY OF THE INVENTION

According to the invention, a latching clutch of the type indicated above is characterised in that the drive disc engages via its toothing with a toothing belonging to a crown ring and in that the crown ring is integral with the rim of the first guide washer. According to the invention, a hydrokinetic coupling apparatus is characterised in that it includes such a clutch.

By virtue of the invention, the first guide washer is made rigid since it is the crown ring which has the toothing engaging with that of the drive disc. The crown ring at least partly covers over the rim of this guide washer.

This guide washer is therefore devoid of drive spurs so that it is easier to manufacture.

The tooling for manufacturing the first guide washer is therefore simpler and less expensive. Moreover, this first guide washer can be thinner because of the presence of the crown ring.

The crown ring is a component which is simple to manufacture and stiffens the rim of the first guide washer, which is therefore less sensitive to centrifugal force phenomena. The crown ring, in one embodiment, has a thickness which is different from that of the first guide washer. This crown ring is advantageously thicker than the first guide washer, which makes it possible to reduce wear and to transmit more torque. In any event, the toothing may be of the desired amplitude, which makes it possible to dispense with heat treatments for hardening. For example, in the case of a toothing with alternating spurs and spaces, the spurs can be circumferentially wider and thicker than those of the prior art. By virtue of the crown ring, the toothing may be of any shape. It may be continuous without alternating spurs and spaces. The toothing, in one embodiment, is of axial orientation, and, in a variant, of radial orientation.

In one embodiment, the crown ring is applied and fixed, for example by welding, onto the rim of the first guide washer.

In a variant, the crown ring is of a single piece with the rim, being obtained by rolling from the rim. More precisely, the crown ring is rolled and folded in the reverse direction in order to double the thickness of the rim.

The crown ring is in intimate contact with the outer periphery of at least a part of the rim of the first guide washer. The crown ring may also, partly, closely follow the rounded part linking the rim to the inner periphery of the first guide washer.

When the toothing of the crown ring is of axial orientation, it can be installed on a circumference of greater diameter than that of the prior art.

The piston may thus extend radially beyond the average diameter of the springs acting between the first guide washer and the web which is integral with the output element.

It is thus possible to increase the outer diameter of the friction lining or linings associated with the drive disc. It is therefore possible to transmit more torque.

By virtue of the crown ring, it is possible to increase the axial size of the toothing in such a way that the crown ring can rotationally drive more than one drive disc. The crown ring makes it possible to have better control of the dimensions of the toothing.

The description which will follow illustrates the invention with regard to the attached drawings in which:

DETAILED DESCRIPTION OF PREFERRED EMBODIMENT

As is known, a hydrokinetic coupling apparatus includes an input element intended to be linked in rotation to a driving shaft, an output element, intended to be linked in rotation to a driven shaft, and at least one vane-type turbine disc and a vane-type impeller disc acting between the input and output element.

The input element takes the form of a sealed casing filled with a liquid, usually oil. The casing includes a first half-shell, provided with a wall of overall transverse orientation, and a second half-shell internally forming the vane-type impeller disc. The turbine disc is installed facing the impeller disc and is integral with the output element consisting of a hub which is grooved internally in order to be linked rotationally with the driven shaft equipped centrally with a channel for supplying a variable-volume hydraulic control chamber described below.

As regards an application for a motor vehicle, the driving shaft consists of the crankshaft of the internal-combustion engine of the motor vehicle, while the driven shaft consists of the input shaft of the motion transmission of the motor vehicle.

Usually, the transverse wall of the first half-shell carries means for linking it in rotation to the driving shaft either by means of a flange, or by means of a torsion damper, while the second half-shell is affixed by welding, leaktightly at its outer periphery, onto the outer periphery of the first half-shell.

The rotation of the transverse wall, fixed axially, entails a circulation of fluid between vanes of the impeller and turbine discs, and thus a rotational driving of the turbine disc and of the driven shaft.

Conventionally, a free-wheel reaction disc is provided so that the torque converter is mounted within the sealed casing.

When the vehicle is started the disc of the turbine is therefore driven in rotation.

Subsequently, slippage phenomena occur between the turbine and impeller discs.

These slippages cause an increase in the fuel consumption for the motor vehicle.

In order to avoid these slippages and this increase in consumption, a latching clutch is brought into action between the input an output element, so as to establish a direct link between these elements.

It is also possible to filter the vibration better by making this clutch spin.

In order to do this, the latching clutch, also called "Lock-up", here includes a piston, of transverse orientation overall, linked in rotation to the transverse wall while being mounted axially moveable with respect to this wall. The piston is mounted axially moveable along a guide ring at the outer periphery thereof with the interposition of a gasket, the piston, in order to do this, having a ferrule at its inner periphery. The ring is interposed axially between the transverse wall of the input element and the hub forming the output element.

This ring is equipped with passages, such as borings, and centrally exhibits a blind hole into which the passages open out.

The input element takes the form of a sealed casing filled with a liquid, usually oil. The casing includes a first half-shell, provided with a wall of overall transverse orientation, and a second half-shell internally forming the vane-type impeller disc. The turbine disc is installed facing the impeller disc and is integral with the output element consisting of a hub which is grooved internally in order to be linked rotationally with the driven shaft equipped centrally with a channel for supplying a bariable-volume hydraulic chamber desribed below.

This centring device passes centrally through the transverse wall thanks to a hole in it, and extends projecting axially along a portion of smaller diameter in such a way that the centring device is stepped in diameter.

This control chamber is bounded radially externally by at least one drive disc interposed axially between the piston and the transverse wall and able to be held tightly between them.

This disc includes a transverse ring face-to-face with transverse bearing areas formed at the outer periphery respectively of the piston and of the transverse wall.

Friction material is interposed, on the one hand, between the bearing surface of the piston and the ring of the drive disc and, on the other hand, between the bearing surface of the transverse wall and the ring of the drive disc. The bearing surfaces of the piston and of the transverse wall can be formed directly on the piston and the transverse wall.

In a variant at least one of the bearing surfaces is produced on a component affixed to the piston or the transverse wall.

The bearing surfaces may be fixing surfaces. In this case, a friction lining is affixed onto each of the bearing surfaces, in a variant, the bearing surfaces are rubbing surfaces.

To that end, the ring of the drive disc can be embedded into a friction lining. Usually, the said ring is coated on each of its faces with a friction lining affixed for example by bonding, welding, brazing onto this ring.

The friction lining or linings can be equipped with grooves in order to establish communication between the variable-volume chamber and the rest of the interior of the casing in order to cool the friction lining or linings. In a variant, the grooves are formed in the component affixed to the piston and/or the transverse wall for forming the above-mentioned bearing surface.

Hence, by varying the pressure on either side of the piston, for example by varying the pressure of the variable-volume chamber, the piston is shifted axially in one direction or the other so as, via the friction lining or linings, to clamp the ring of the drive disc between the piston and the transverse wall, or release the ring from the drive disc.

This is achieved, for example, by varying the pressure in the channel passing through the driven shaft so as to supply fluid to the variable-volume chamber via the blind hole and the passages formed in the guide ring, forming a centring device in certain applications.

When the ring of the drive disc is held tightly, it is said that the latching clutch is engaged or bridged, the rotational movement of the transverse wall being transmitted to the output element via the drive disc coupled rigidly or elastically to one of the output element-turbine disc elements.

When the said ring is released, the drive disc no longer drives the turbine disc and the output element in rotation. It is said that the latching clutch is then disengaged or unbridged. All this is well known to the person skilled in the art. The drive disc is therefore intended to be driven, in such a way that it can be de-clutched, by the transverse wall.

In the embodiment presented, the hub 1, forming the output element of the hydrokinetic coupling apparatus, penetrates within the blind hole 2 of the guide ring 3 of the piston 4. This ring 3 forms a centring device for centring the apparatus with respect to the driving shaft, which is not presented. The ring 3 is therefore integral, here by welding, with the transverse wall 6 and thus passes leaktightly through a central hole 5 of this transverse wall 6 of the first half-shell 7 of the sealed casing 8 of the apparatus, the second half-shell of which, forming a vane-type impeller disc 10, can be seen at 9 facing the turbine disc 11, provided with an inner ring 12 secured by riveting to a flange 13, which the hub 1 has at its outer periphery.

This flange 13 also serves for fixing a web 14 belonging to the latching clutch 15. Here, the flange 13 is notched for fixing with centring of the web 14 and of the ring 12 by the use of the same series of rivets 16.

The latching clutch 15 also includes two guide washers 17, 18 arranged on either side of the web 14 and fixed together at their inner periphery by posts passing, with circumferential clearance, through circumferential apertures 20 formed in the web 14. The web 14 and the guide washers 17, 18 are installed between the turbine disc 11 and the piston 4.

One of the guide washers, called first guide washer 17, is intended to mesh with the drive disc 21 by means, according to the invention, of a crown ring 22 with toothing integral with the first guide washers 17 so as to make this washer 17 more robust. Because the first guide washer is not linked directly in rotation with the disc 21 and because of the presence of the crown ring 22 it is possible to reduce the thickness of the guide washers 17, 18 and to facilitate the manufacture thereof.

The drive disc 21 here carries, fixed for example by bonding, on each of its faces a friction lining 22 intended to rub on a rubbing surface 23, 24 formed respectively on the piston 4 and on the transverse wall 6 of the first half-shell 7. This wall 6 carries, at its outer periphery, projecting outwards, nuts 25 each integral with a bracket-shaped component 26 welded to the first half-shell, which here is of metal. The nuts 25 and the components 26 belong to the means for rotational linking of the first half-shell 7, and thus of the wall 6, to the driving shaft, here via a flange which is not visible.

The bearing surface 24 is formed on a washer 28 affixed internally by welding to the wall 6.

The variable-volume control chamber is seen at 29, bounded axially by the wall 6 and the piston 4 and radially, on the one hand, externally by disc 21 and, on the other hand, internally by the centring device 3 equipped with inclined channel 30, forming, in the abovementioned way, the passages for supplying the chamber 29 from the driven shaft 31 equipped with a central supply channel, not referenced.

The shaft 31 is integral in rotation with the hub 1 via a spline-type link. A lip-type gasket 32 is present between the inner periphery of the hub 1 and the outer periphery of the axial extremity of the shaft 31.

A ring 33, forming a bearing and a sealing segment 34, is present between the outer periphery of the hub 1 and the inner periphery of the centring device 3, consisting of the contour of the blind hole 2 of the centring device into which penetrate the hub 1 and the shaft 31. A thrust needle bearing 35, of transverse orientation, is present between the front face of the hub 1, turned towards the wall 6, and the rear face facing the centring device 3 turned towards the turbine disc 11.

The piston 4, here of sheet metal, is stamped locally to form bosses 38 for fixing the first ends of tangential tabs 36 placed between the piston 4 for rotationally linking, with axial mobility, the piston 4 to the wall 6, the said piston 4 sliding in a leaktight way on the outer periphery of the centring device 3. The tabs 36 are axially elastic.

The fixing of the first ends of the tabs 36 is carried out as described in the document FR-A-2 726 620 which will be referred to for further details.

Thus, at 37, is seen one of the means, in two parts, of the rod and crimped ring type, for fixing of the tabs 36 onto the fixing bosses 38 of the piston 4.

The second ends of the tabs 36, inserted into the variable-volume control chamber 29, are fixed onto a common drive component 39 here fixed by riveting onto the wall 6 by the use of rivets produced by extrusion from the wall 6.

In a variant, the fixing of the component 39 is achieved by welding, bonding or otherwise.

The drive disc 21 is flat and has transverse toothing 40 at its outer periphery radially beyond the bearing surfaces 23, 24 and the piston 4. The crown ring 22, of axial orientation overall, has axial toothing 41 complementary to that 40 of the disc 21. The crown ring 22 here is thicker than the guide washer 17 and the disc 21. The toothings 40, 41 here constitute an alternating series of teeth and of notches or cutouts.

Thus, the teeth of the toothing 40 of the disc 21 penetrate, with a clearance fit, into the notches of the toothing 41 of the crown ring 21. The disc 21 is therefore linked in rotation to the crown ring 22 while being able to be shifted axially with respect to it, the toothings 40, 41 constituting meshing means acting between the disc 21, flat in shape, and the crown ring 22 of axial orientation. Elastic members 42, with circumferential action, act between the guide washers 17, 18 and the web 14.

The members 42 here consist of pairs of concentric helical springs, installed over a midcircumference of diameter D1 with respect to the axis X—X of rotation of the apparatus forming the axis of axial symmetry thereof. This diameter D1 is greater than the internal diameter D2 of the friction linings 22, while being less than the outer diameter D3 of these linings 22, the diameters D1 to D3 being considered with respect to the axis X—X. By virtue of the invention, the toothing 41 is installed over a larger diameter than in the prior art, and the piston 4 comes as close as possible to the toothing 41. This is made possible by virtue of the presence of the crown ring 22. The linings 22 may be of a larger size than that of the prior art.

The springs 42 are housed in the notches 43 formed at the outer periphery of the web. These notches 43 are thus bounded by radial spurs 44, with centring fingers, serving as a support for the circumferential extremities of the springs 42. The washers 17, 18 are shaped at their outer periphery so as closely to follow the shape of the springs 42. The first guide washer 17 includes, at its outer periphery, an annular rim of axial orientation 45 surrounding the springs 42 and the web 14. This rim 45 has, at its free end, axial orientation lugs 46 passing through apertures 47, here rectangular, formed at the outer periphery of the second guide washer 18 adjacent to the turbine disc.

By flattening, for example when hot, the circumferential ends of the lugs 46, of rectangular cross-section, the material is made to flow so as to achieve fixing by crimping of the guide washers 17, 18, which here are of metal, the second guide washer 18 locally coming to bear against a shoulder of the lugs 46, while being blocked, on the one hand, axially by the flowing of material and, on the other hand, in rotation by the apertures 47.

The metal guide washers 17, 18 are stamped locally at 48, 49 respectively for support of the circumferential extremities of the springs 42. Upon relative movement between the web 14 and the guide washers, the springs 42 are compressed between the supports 44–48, 49, the spurs 44 move with respect to the stampings 48, 49. The guide washers 17, 18 reconstitute a channel within which the springs 42 are housed.

The guide washers 17, 18 therefore have, in cross-section, a rounded shape 50, 51 at their outer periphery, so as closely to follow the shape of the springs. The roundings are interrupted locally by the stampings 48, 49. The rounding 50 of the first washer 17 is thus extended by the rim 45. The guide washers 17, 18 are therefore wider at their outer periphery than at their inner periphery. The crown ring 22 makes it possible to facilitate the shaping of the stamped features 48, 49 and of the roundings 50, 51 because the thickness of the washers 17, 18 can be less.

As is revealed by the description and the drawings, the guide washers 17, 18 are installed at the outer periphery of the turbine disc 11. The rim 45 extends radially beyond the piston, as well as the crown ring 22, here made of metal, with its toothing 41. The disc 21 is linked in rotation to the crown ring 22 with the capability of axial movement by virtue of the toothings 41, 40; respectively of axial and radial orientation. The crown ring 22 closely follows the shape of the rim, as well as a part of the rounding 50 of the first washer 17. The toothings 40, 41 consist of an alternating series of spurs and of cutouts or notches, the spurs of the disc 21 penetrating into the cutouts of the crown ring 22 and vice versa. The spurs 52 of the crown ring 22, here made of sheet metal, are offset radially inwards, towards the X—X axis, with respect to the main part of the crown ring. The offset is smaller than in the prior art since there is no cutting-out and folding to be done. The main part of the crown ring is in intimate contact with the rim 45 and is fixed to it, here by welding. More precisely, the crown ring is in intimate contact with at least a part of the outer periphery of the rim 45 and thus partly surrounds the rim 45. The crown ring 22 therefore partly covers over the rim 45.

A connecting area 54 connects the main part of the crown ring to the toothing 41. The spurs 52 extend radially beyond the washer 28, which thus avoids any interference between the crown ring and the transverse wall 6. This wall is bulged between its outer and inner periphery, in such a way that the nuts 25 do not extends in axial projection.

The crown ring 22 is in contact, via its inner periphery, with a part of the outer periphery of the rim 45 and with the outer periphery of a part of the rounding 50. The spurs 52 are thus thicker than those of the prior art, which makes it possible to transmit more torque. These spurs 52 may have the desired length and width.

Moreover, these spurs 52, and, in a general way, the toothing 41, are installed over a larger circumference than those of the prior art, which makes it possible to transmit more torque and to increase the radial size of the friction linings 22, with the benefit of a reduction in wear.

Clearly, the presence of the washer 28 is not mandatory. This washer can be replaced by a stamped annular area 128 projecting axially in the direction of the turbine disc 11. As in the preceding figures, the toothing 141 of the crown ring 22 extends radially beyond the area 128, exhibiting a bearing surface 24 of transverse orientation for rubbing contact for a second drive disc 121 coated on each of its faces with a friction lining 22. An intermediate friction disc 221 is interposed axially between the friction linings of the discs 21, 121. The drive component 39 is extended at its outer periphery by an axial hoop 139, equipped with toothing 240, of axial orientation.

The disc 221 exhibits, at its inner periphery, a toothing 241, of radial orientation, meshing with the toothing 240. The toothings 240, 241 are similar to the toothings 40, 41 of FIGS. 1 to 4, the spurs of one toothing penetrating into the notches of the other toothing and vice versa. The toothing 141 of the crown ring 22 is longer axially in order to be able to mesh with a toothing 140 which the disc 121 has at its outer periphery. Here, the discs 121, 21 are identical and the latching clutch is multi-disc, like that described in the documents FR-98 08734 filed on Aug. 7, 1998 and WO/FR99/01656 filed on Aug. 7, 1999. The toothings 40, 140 come into engagement with the toothing 141 of the crown ring.

All the forms described in these documents can be used. Hence, the drive component can be equipped with a hoop of frustoconical shape for driving the intermediate disc 221. The discs 121, 21 may not be identical, the disc 21 possibly driving the disc 121. Clearly, the toothing 141, 41 of the crown ring 22 may be continuous and it is possible to reverse the structures.

Figure 3:
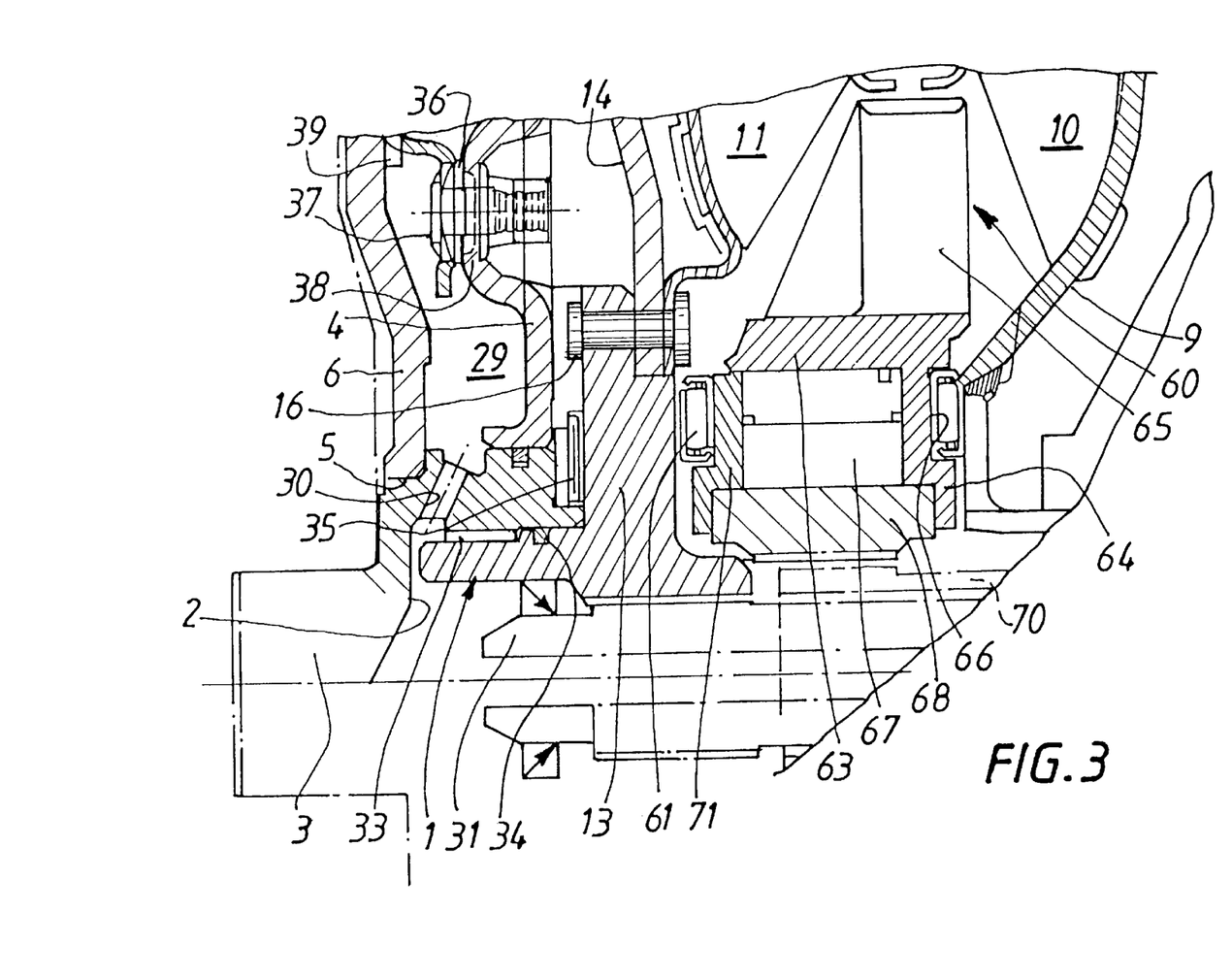
FIG. 3 is a view on a larger scale of the lower part of FIG. 1.
Figure 4:
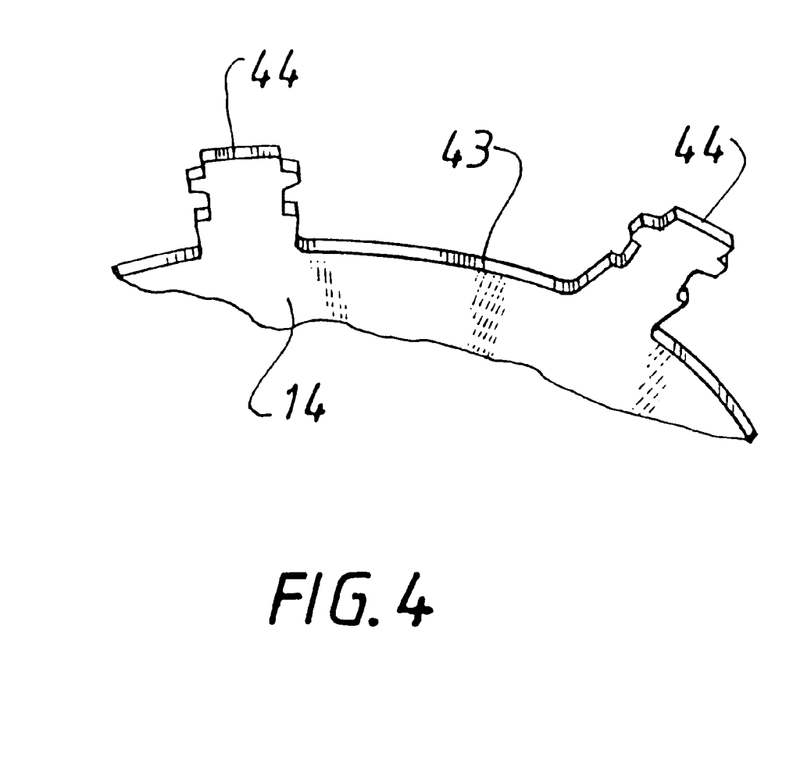
FIG. 4 is a partial view in perspective showing one arm of the web.
Figure 5:
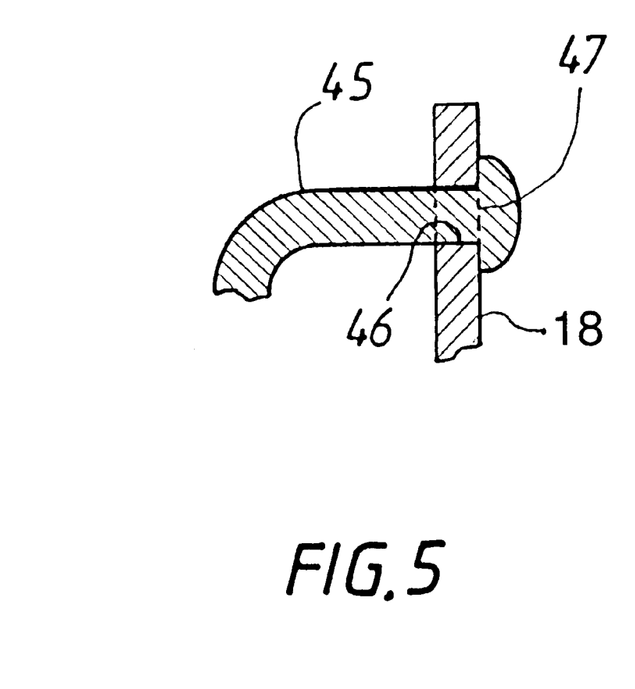
FIG. 5 is a partial view in perspective showing the assembly of the two guide washers.

Thus, the toothing of the crown ring 22 may be of radial orientation, directed radially inwards towards the axis X—X, and that of the disc 21 of axial orientation, as, for example, in the embodiment of FIG. 3 of the abovementioned application FR-98 08734.

The crown ring 22 may be of a single piece with the rim 45, which is then rolled and turned over and folded in the reverse direction so as to form a double thickness, with a weld in order to improve the solidity. The crown ring is therefore in contact with the outer periphery of the rim 45.

The crown ring 22 is thus of a single piece or is attached and fixed to the rim 45 of the first guide washer. The fixing of the crown ring onto the rim can be carried out by welding or any other fixing means, such as bonding, riveting, etc. By virtue of the invention, the size of the toothing 141 is increased, which makes it possible to drive at least two drive discs 21, 121 in rotation, and thus to transmit more torque by virtue of the increase in the number of friction surfaces. The size of the toothing is more easily controllable. Hence, in FIG. 6, the spurs which the toothing 141 has are sufficiently long axially to be linked in rotation with two drive discs 121, 21 of flat shape. It will be noted that provision is made here for a reaction disc 60 and that the thrust bearings in the form of needle bearings 61, 62 are interposed between the disc 60 and the flange 13 and the second half-shell 9 respectively.

More precisely, the reaction disc 60 includes a body 63, 64 from which the vanes 65 of the disc 60 originate.

This body 63, 64 has a bracket-shaped cross-section with an annular part, of axial orientation, 63, from which the vanes 65 originate by moulding, and a part of transverse orientation directed towards the X—X axis.

The part with transverse orientation 64 has a groove 66 for holding the thrust bearing 62, of transverse orientation just like the thrust bearing 61.

The groove 66 axially retains the thrust needle bearing 62 in the bottom and centres it with its side walls.

The disc 60 is equipped with a free wheel 67 acting radially between the body 63, 64 and a central hub 68 wedged in rotation on a fixed sleeve 70.

According to one characteristic, the other radial thrust needle bearing 61 acts between the flange 13 and a component 71 fixed by crimping onto the end of the part 63. The component 71 is a closure component retaining the rollers of the free wheel and extends parallel to the part 64.

The component 71, of transverse orientation, and the part 64 are hollowed out internally in order to form a shouldered housing serving to centre the hub 68 and to retain it axially in one direction. The component 71 and the part 64 are thus each in intimate contact, on the one hand, with the outer periphery of one of the ends of a hub 68 and, on the other hand, with the transverse end face of the said hub 68.

The component 71 is shouldered at its outer periphery in order to serve for axial support and centring for the thrust bearing 61. Hence, by virtue of the various thrust bearings 35, 61, 62 and bearing 33, the friction is reduced to the minimum and the axial thrusts are properly dealt with.

Needless to say, the present invention is not limited to the embodiment described.

In particular, the piston can be linked in rotation to the transverse wall via a link with interlocking shapes allowing axial shifting of the piston. The latter may, for example, carry a ring oriented axially and equipped with a toothing interacting with a toothing of a component integral with the transverse wall, such as the washer 28 of FIG. 1.

Figure 6:
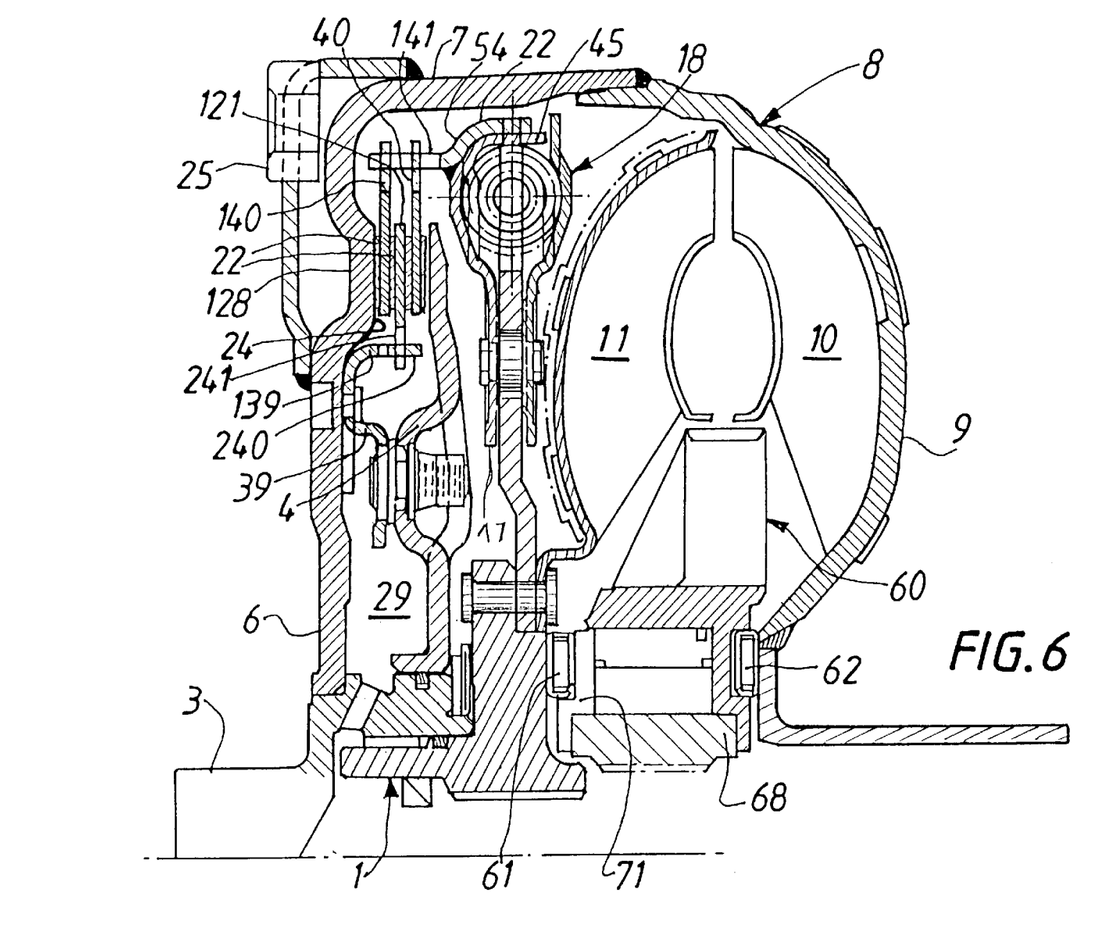
FIG. 6 is a view similar to FIG. 1 for another embodiment.

The guide washers 17, 18 belong to a torsion damper including the web 14 and the elastic members 42. This torsion damper, with a high transmission torque, belonging to the latching clutch 15, may have two stages of elastic members as described in the document FR-B-2 749 634. This damper, in a variant, includes only the first guide washer 17 and the web 14. In this case, the rim is extended by a rounding for retaining the members 50. In FIG. 6, the piston can extend radially higher as in FIG. 1.

Needless to say, the crown ring can be thinner and be heat treated, after welding, at the same time as the guide washers 17, 18, in order to confer on it the desired hardness. Hence the crown ring, according to the invention, may be carbonitrided. Welding can be of any type, for example of the "Tig", "Mig", of the laser-welding type or of the electric spot-welding type.

Figure 1:
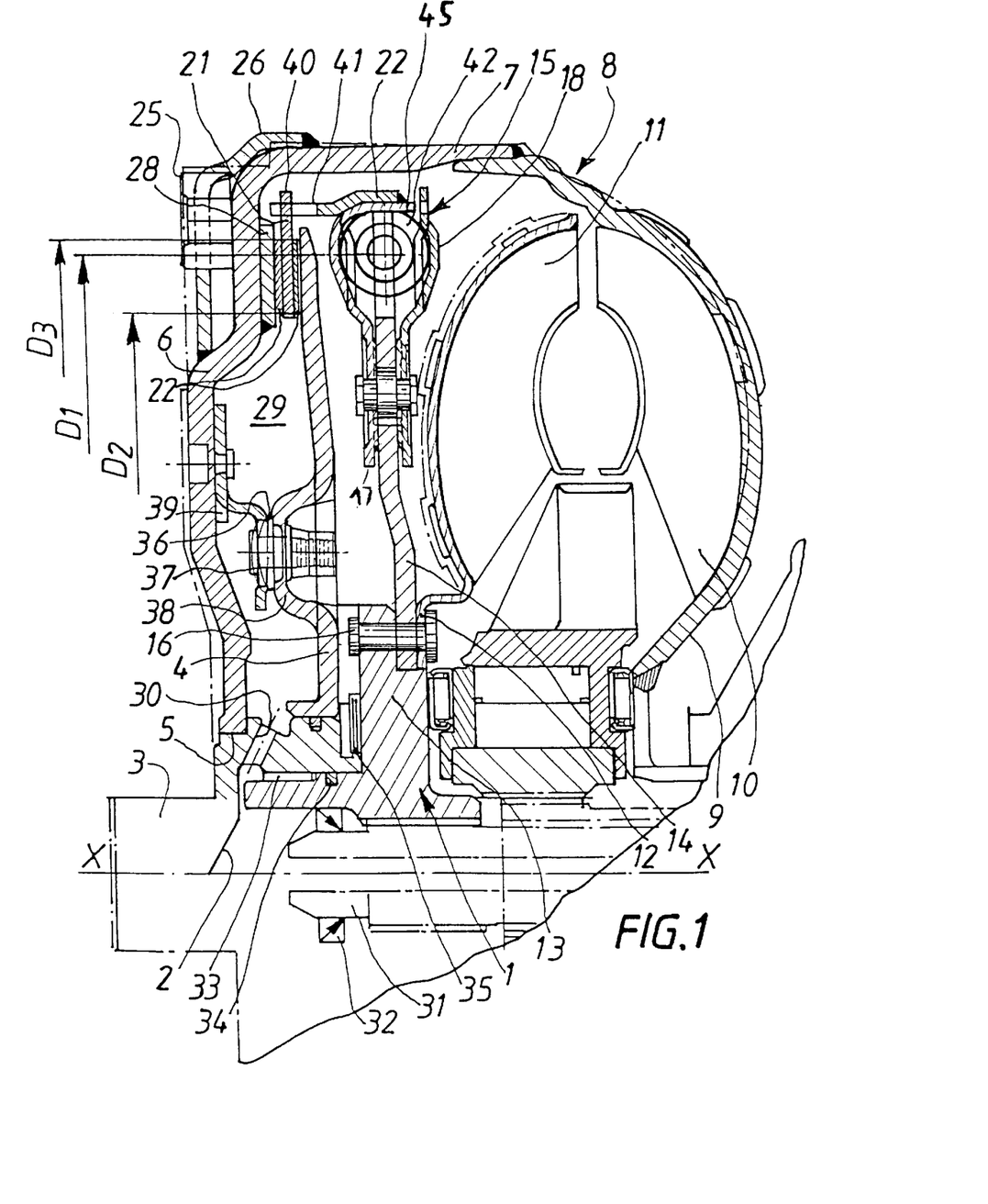
FIG. 1 is a partial view in section of an apparatus equipped with a latching clutch, according to the invention, in clutch-disengaged position.
Figure 2:
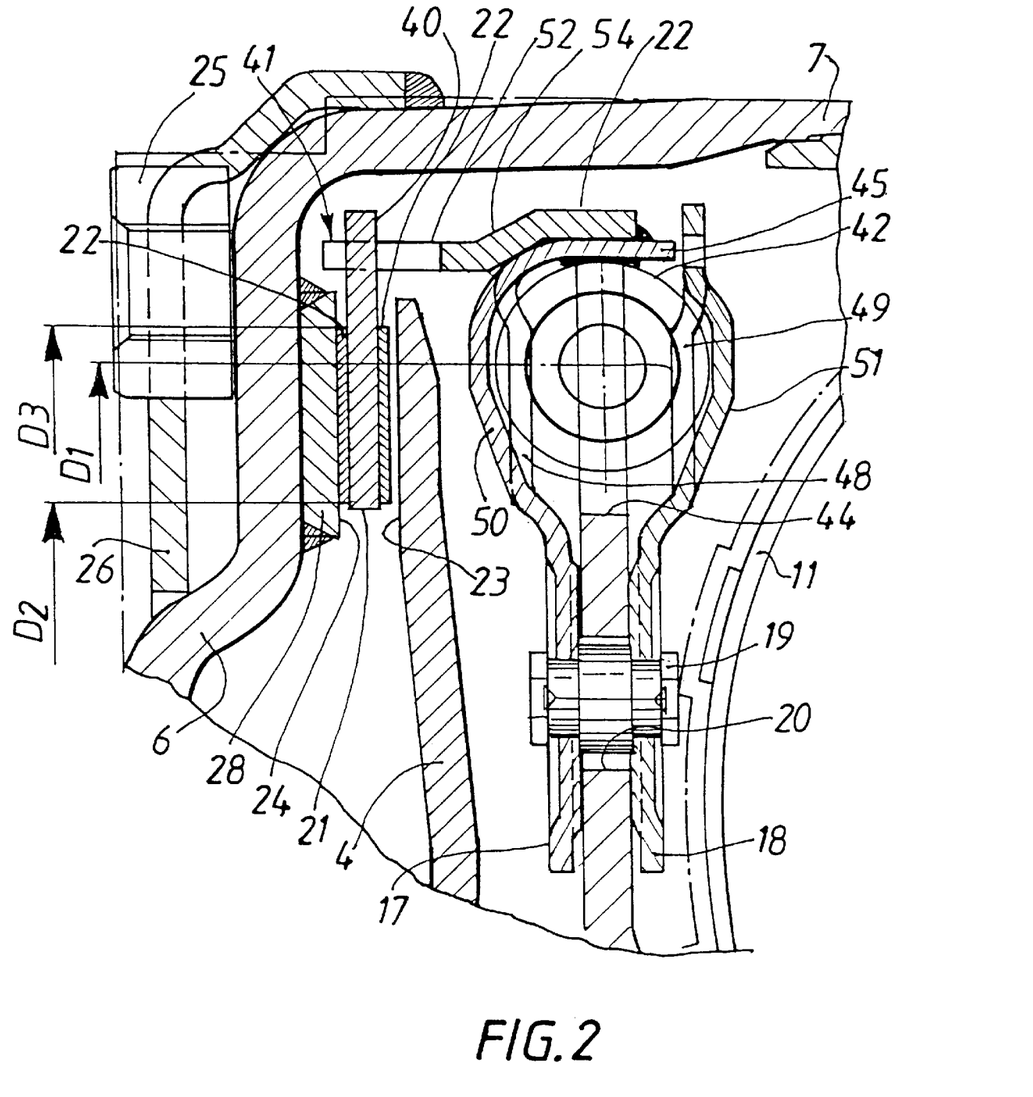
FIG. 2 is a view on a larger scale of the upper part of FIG. 1.

In FIGS. 1 and 6, two weld beads are provided respectively at the free and of the crown ring 22 and in the region of the junction of the crown ring 22 with the rounding 50.

What is claimed is:

1. Latching clutch acting such that it can be de-clutched between a transverse wall (6) of an input element (7) and an output element (1) of a hydrokinetic coupling apparatus, including at least one drive disc (21, 121) suitable for being driven in rotation, in such a way that it can be de-clutched, by the transverse wall (6), a first guide washer (17) coupled by means of elastic members (42) to a web (14) and linked in rotation to a toothing (40, 140) which the drive disc (21, 121) has at its outer periphery, wherein the first guide washer (17) exhibits, at its outer periphery, an annular rim (45) of axial orientation surrounding the web (14), wherein the drive disc (21, 121) engages via its toothing with a toothing (41, 141) belonging to a crown ring (22) integral with the rim (45) of the first guide washer (17), and wherein the crown ring (22) is in intimate contact on its inner periphery with at least a part of the outer periphery of the rim (45) of the first guide washer (17).

2. Clutch according to claim 1, wherein the crown ring (22) is of a single piece with the rim (45) of the first guide washer (17).

3. Clutch according to claim 1, wherein the crown ring (22) is applied and fixed onto the rim (45) of the first guide washer (17).

4. Clutch according to claim 1, wherein the crown ring (22) partly covers a rounding (50) which the first guide washer has for housing the elastic members (42).

5. Clutch according to claim 1, further including two drive discs in engagement with the toothing (141) of the crown ring (22).

6. Clutch according to claim 1, wherein the toothing (41, 144) of the crown ring (22) is of axial orientation.

7. Clutch according to claim 1, wherein the crown ring (22) is thicker than the first guide washer (17).

8. Hydrokinetic coupling apparatus comprising a piston (4) integral in rotation, with axial mobility, with the transverse wall (6) of the input element (7) and a clutch equipped with at least one drive disc (21, 121) according to claim 1, said disc being capable of being clamped in such a way that it can be de-clutched between the piston (4) and the transverse wall (6).

9. Apparatus according to claim 8, wherein the piston (4) extends radially beyond the mean radius of the elastic members (42).

* * * * *